United States Patent Office 3,367,894
Patented Feb. 6, 1968

3,367,894
LOW TEMPERATURE BAKING RESIN
Carl E. Bruggeman, Thornton, Ill., assignor to Standard Oil Company, Chicago, Ill., a corporation of Indiana
No Drawing. Filed June 14, 1962, Ser. No. 202,373
2 Claims. (Cl. 260—22)

This invention relates to resins suitable for producing both baked finish surface coatings and air-dry finish surface coatings.

Thermosetting resins including those soluble in organic solvents and those soluble in water have been prepared from a benzene tricarboxylic acid or its anhydride, aliphatic dicarboxylic acid, alkylene glycol, and fatty oil or unsaturated fatty acid from the fatty oil or partial ester thereof. These resins are, in general, very suitable for use as primers in the surface coating of automobiles in that their baked coatings exhibit desirable impact resistance and hardness. However, these resins have an important disadvantage, their baking temperature. Generally, this temperature is approximately 300° F. or higher for the usual minimum baking time (25-30 minutes) required in the automotive industry. This temperature is considered too high and a lower baking temperature is desired. A lower baking temperature reduces the danger of fires, aids in solvent recovery, reduces the protective insulation on the equipment used to apply the primer, etc. An additional problem with some of these resins has been that their baked coatings do not exhibit entirely satisfactory resistance to salt spray or adhesive properties. Resistance to salt spray is important as a measure of the coating's ability to protect a surface adjacent to an exposed and rusting metallic surface. Adhesive properties are important as they are a measure of the coating's ability to adhere to the surface requiring protection and to adhere to additional protective coatings applied over the initial coating.

One object of this invention is a baking resin which is suitable for protective surface coatings which bake below 300° F. in 25-30 minutes. Another object is an organic solvent soluble resin which is suitable for protective coatings which bake below 300° F. in 25-30 minutes and exhibit good impact resistance and hardness. An additional object is a water soluble baking resin having a baking temperature below 300° F. and suitable for protective surface coatings which exhibit good impact resistance and hardness. Yet another object is a baking resin suitable for protective surface coatings which exhibit good adhesive properties. Still another object is a baking resin suitable for protective coatings which exhibit good resistance to salt spray. Other objects of this invention will become apparent from the detailed description of the invention.

It has been discovered that a baking resin formulated from oiticica oil, tung oil or fatty acids thereof or partial esters of these fatty acids, in addition to the benzene tricarboxylic acid, aliphatic dicarboxylic acid, and alkylene glycol is suitable for surface coatings which bake at approximately 250° F., a temperature considerably below the higher 300° F., in 25-30 minutes. It has also been discovered that the baked coatings from these resins exhibit good impact resistance and hardness. An additional discovery has been that the resin derived from oiticica oil, tung oil or fatty acids or partial esters thereof is soluble in organic solvents and can be converted into a water soluble resin by reacting the polycondensation reaction product in the resin with an alkaline agent and that surface coatings from the water soluble resin bake at the same temperature (250° F.) in 25-30 minutes. These baked surface coatings also exhibit good impact resistance and hardness. In addition, it has been discovered that a resin formulated from a vinyl group containing material such as vinyl toluene produces baked surface coatings which exhibit improved resistance to salt spray and good adhesive properties. A further feature of these resins are their ability to air-dry to a satisfactory film at ordinary atmospheric temperatures.

Resin

The organic solvent soluble resin comprises a polycondensation reaction product prepared by condensing a benzene tricarboxylic acid or anhydride thereof, an aliphatic dicarboxylic acid having at least 4 carbon atoms, an alkylene glycol, and an alcoholysis product of oiticica oil or tung oil, or a polyunsaturated fatty acid from either or both of these oils, or a partial ester of at least one of the polyunsaturated fatty acids. The polycondensation reaction is generally carried out at about 300°-400° F., particularly, when trimellitic acid or its anhydride is the aromatic acid, and the water formed in the reaction is continuously removed. The benzene tricarboxylic acid and its anhydride may be considered collectively as an acidic member and include such members as trimellitic acid, trimellitic anhydride, hemimellitic acid, hemimellitic anhydride, and trimesic acid, with trimellitic acid and trimellitic anhydride being preferred because of their availability and the especially desirable results obtained from resins formulated from these acids. In addition to unsubstituted acids and anhydrides, there may be utilized substituted acids and anhydrides. The substituents must be inert with respect to entering into the reaction and should not be hydroxyl or amino groups. Types of substituents which may be present are hydrogen; alkyl groups having 1-5 carbon atoms and preferably methyl, t-butyl, sec-butyl, and neopentyl; and halogens, preferably chlorine. The unsubstituted and substituted acids and anhydrides are hereinafter generally referred to as acidic members and the amounts of the various reactants charged to the polycondensation zone are considered with respect to the acidic member charged to that zone.

The reaction requires the presence of an aliphatic (saturated and olefinic unsaturated) dicarboxylic acid containing at least 4 carbon atoms and preferably from 4 to about 30 carbon atoms, and especially the alkandioic acids containing from 4 to about 20 carbon atoms because of their ready availability and the highly desirable results from resins formulated from these acids. Examples of suitable acids are succinic, glutaric, adipic, suberic, sebacic, maleic, itaconic, 1,6-hexene-3-dioic, linoleic-dimer, hexadecane dioic, eicosanedioic, hexacosanedioic and tetratriacontane.

The glycol used in the preparation of the polycondensation reaction product is an alkylene glycol containing from 2 to about 20 carbon atoms. It is to be understood that the term alkylene glycol includes the glycols containing only hydroxyl groups and those containing either linkages as well as the hydroxyl groups. Exceptionally good results are obtained using the alkylene glycols containing from 2 to 9 carbon atoms. These glycols may also be described as methylene glycol containing not more than 9 carbon atoms, polyethylene glycol containing not more than 8 carbon atoms, and polypropylene glycol containing not more than 9 carbon atoms. Illustrative glycols suitable for use in the invention are: ethylene glycol, propylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, 1,3-butanediol, 2,3-butanediol, 2,4-pentanediol, 2-methyl-2,4-pentanediol, 2,3-butanediol, 2,2-dimethyl-1,3-propanediol, 2-ethyl-1,3-hexandiol, 2-ethyl-2-butyl-1,3-propanediol, diethylene glycol, triethylene glycol, tetraethylene glycol, dipropylene glycol, tripropylene glycol, and the like.

The reactants for the polycondensation reaction also include a fatty acid member derived from oiticica oil, tung oil or fatty acids thereof or esters thereof. Generally, the fatty acid member is an alcoholysis product of oiticica oil and/or tung oil and a polyhydric paraffinic alcohol having at least 2 hydroxyl groups such as the defined alkylene glycols and glycerol; or an unsaturated fatty acid or acids derived from these oils; or a partial ester or esters of at least one of these acids and the defined polyhydric paraffinic alcohol. It is preferred that the desired alcoholysis product and partial ester have at least from 1 to 2 free hydroxyl groups since the polyester chains would not then have free hydroxyl groups in non-terminal positions.

The partial esters of the mixture of fatty acids in oiticia oil are especially suitable for the polycondensation reaction, particularly the esters from neopentyl glycol. Oiticica oil contains polyunsaturated acids such as lincanic acid and this acid is especially preferred when only one fatty acid is utilized. Eleostearic acid in tung oil is also very suitable. These and other triethanoid fatty acids of the conjugated type may be used or mixtures of fatty acids roughly corresponding to the compositions of fatty acid groups in oiticica oil or tung oil may also be utilized.

The characteristics of the polycondensation reaction product and resin are dependent upon the type of reactants, and upon the mole ratios of the reactants. In general, the mole ratio of the defined acidic member, dicarboxylic acid, and alkylene glycol, plus the fatty acid group in the defined fatty acid member, are present in a mole ratio of from about 1:1:2 to 10:1:25. Ratios of reactants outside the spelled out range may be utilized for production of resins having special properties. More usually, the mole ratio of defined acidic member to defined dicarboxylic acid is between about 2 and 5.

A suitable range for the oil content of the resin is from about 15 weight percent to about 75 weight percent based on the weight of reactants for the polycondensation reaction product, and preferably from about 20 weight percent to 45 weight percent since this range results in a better balance between curing and water solubility of the resin.

The polycondensation reaction product desirably is carried out under conditions of reaction such that the resin has an acid number the lowest possible commensurate with avoiding gelation. In general, the acid number of the polycondensation reaction product will be between about 20 and 100 and preferably between about 40 and 70. (It is to be understood that not all combinations of the defined reactants can produce an acid number as low as 20, however.)

The polycondensation reaction is generally well-known, particularly with reference to trimellitic acid and trimellitic anhydride. When a higher melting acid such as trimesic acid is utilized as the acidic member, it is desirable to dissolve the trimesic acid in a suitable solvent such as N,N-dimethylformamide in order that it be in a liquid form under the usual conditions of reaction. It is also possible to carry out the reaction at slightly higher temperatures in order to react the trimesic acid; however, care should be taken to avoid gelation at the higher temperatures.

The resins from the polycondensation reaction product range from very viscous liquids to hard solids in appearance. These resins possess the common characteristics of forming thermoset films and in many cases a flexible film when baked at temperatures in the order of 250° F. for 25–30 minutes in the presence of oxygen or air. Below this temperature these resins require much longer times to cure to thermoset materials.

The resin containing the polycondensation reaction product is soluble in the oxygenated organic solvents commonly used in the surface coating field. The better known of these solvents are alcohols such as methyl and butyl and ketones such as acetone and methylethylketone. Also, these materials may be dissolved in the commonly used mixtures of benzene hydrocarbons such as toluene and xylene with an oxygenated organic solvent; a typical mixed solvent consists of a 60:40 volume ratio of mixed xylenes and butanol.

The resin compositions are excellent film-formers when dissolved in oxygenated organic solvents for use in the formation of baked surface coatings which exhibit good properties of impact resistance and hardness. The compositions in solvent solution may have pigments introduced therein, in order to produce enamel finishes which posses high gloss.

Resin derived from vinyl containing material

A vinyl containing material may be also reacted with the fatty acid group used in the polycondensation reaction product to produce a product or resin which is very suitable for baked surface coatings. Many of these baked surface coatings exhibit good resistance to salt spray and many exhibit good adhesive properties.

The vinyl group containing material includes those materials which have a reactive vinyl group and is illustrated by such well-known materials as vinyl toluene, styrene, alphamethylstyrene, methylmethacrylate, methacrylic acid and acrylonitrile, with the benzene type aromatics being especially preferred and particularly vinyl toluene because of the highly desirable salt spray resistance of their coatings. These groups may be unsubstituted or substituted with such groups as the alkyl and preferably methyl, ethyl and butyl groups, and the halo and preferably chloro and bromo groups.

The vinyl group containing material may be present in an amount up to about 25% by weight based on the solids in the polycondensation reaction product, and preferably from about 5 to about 15%.

The vinyl group containing material may be incorporated into the polycondensation reaction product by a variety of techniques, with the preference being to react the vinyl group containing material such as vinyl toluene with the alcoholysis product of the oil (such as oiticica oil) and the paraffinic polyhydric alcohol (such as neopentyl glycol) in the presence of a peroxide such as di-t-butyl peroxide. The temperature is in the order of 300° to 400° F. and especially about 340° F. since the products resulting from the reaction of this temperature (340° F.) carried out under refluxing have very desirable properties. The vinyl toluene modified product is then incorporated into the polycondensation product by the conventional polycondensation reaction. Another method of incorporating the vinyl group containing material into the fatty acid group may be by reacting the material with the oil prior to the alcoholysis reaction and the polycondensation reaction.

Water soluble resin product

The water soluble resin comprises the resin produced by the reaction of the polycondensation reaction product and an alkaline agent. The polycondensation reaction product may be that derived from the reactants excluding the vinyl containing material or it may include the material. The resin and the alkaline agent are reacted until a water soluble resin is obtained. The amount of alkaline agent is most readily determined by following the pH of the reaction medium. An aqueous reaction medium is preferred when the water soluble resin is to be used for surface coating applications because the desired water solution is obtained immediately. When the resin and aqueous reaction medium are contacted in the presence of an alkaline agent, the resin passes into solution substantially completely at a pH of about 6. In practically all instances, the resin will be in complete solution at a pH of about 7. The use of an alkaline agent in excess of that needed to bring all the polycondensation reaction product into solution is not harmful, at least up to a water solution pH of about 8. It is preferred to have the aqueous solution somewhat on the basic side or neutral, i.e., a pH of from 7 to 8.

The alkaline agent may be any material which reacts with acidity to produce a more neutral product. Ammonia (as the hydroxide) and alkali metal hydroxides are particularly suitable when aqueous reaction medium is desired. The hydrocarbon amines, particularly the lower molecular weight containing not more than 4 carbon atoms in each aliphatic group, are suitable. The amine aliphatic alcohols, such as ethanolamines, and particularly dimethylethanolamines, are especially suitable. The heteroamines, such as morpholine, pyridine, and piperidine may be used. The type of alkaline agent used is determine in part by the characteristics desired in the final water soluble resin; also, by the type of resin product which is to be converted to a water soluble form. Preferred materials are aqueous ammonia, the lower molecular weight alkyl amines, such as ethylamines and butylamines and morpholine, and the alkanolamines, such as monoethanolamine and dimethylethanolamine.

The neutralization reaction is carried out by contacting the resin and the alkaline agent, when necessary in the presence of a liquid reaction medium; particularly suitable reaction mediums are oxygenated organic solvents and water. When water is used as the liquid reaction medium, it is preferred that it be warm, i.e., maintained in the region of 100–160° F.; the resin is added to the aqueous alkaline agent and the two agitated until the resin has passed into solution. Ammonium hydroxide solution is a particularly suitable aqueous alkaline medium. The water solutions of the water soluble resin are clear liquids usually containing some opalescent appearance; the solutions may be colorless or colored, depending on the particular water soluble resin present.

The water soluble resin behaves in essentially the same manner as the resin when exposed to oxygen or air at elevated temperatures in that an air-baked or cured thermoset solid is formed. At temperatures on the order of 250° F., the water soluble resin produces hard films on metal surfaces in times of 25–30 minutes. An outstanding characteristic of the products is that the water soluble resins produce baked coatings which exhibit highly desirable properties of impact resistance and hardness.

These water soluble resins produce solutions containing as much or more than 50 percent by weight of the resin. The water soluble resins are also soluble in the ordinary oxygenated organic solvents, as well as in mixtures of these solvents with benzene hydrocarbons. Because of cheapness and safety, water is the preferred solution for surface coating applications; and also as reaction medium.

In many instances to improve the solubility of the resin in the aqueous medium, a small amount of the lower alkanols is added to the water solution containing the solubilizing agent such as dimethylethanolamine. Such alkanols include ethanol, propanol and butanol.

The water soluble composition may be recovered from the reaction medium and used for the preparation of thermoset solids in the same applications as the resin composition may be used. For surface coating purposes, the solid water soluble compositions are preferably dissolved in a sufficient amount of water to produce the desired viscosity for the particular application.

In many instances, pigments are incorporated into the water soluble resin to produce compositions such as automotive primers and baked coatings having especially desirable properties. Pigments such as iron oxide may be utilized for their hiding power while others such as the barytes, mica, China clay, diatomaceous silica, and barium carbonate may be utilized for their benefit to the respective coating properties of sanding, decreased permeability, settling, adhesion, and stability. Driers such as the commercial lead and cobalt driers may also be utilized.

The following examples illustrate some embodiments of this invention. It is to be understood that these are for illustrative purposes only and do not purport to be wholly definitive with respect to conditions or scope.

Example I

A resin was prepared from 321 grams of oiticica oil (0.34 mole), 373 grams of neopentyl glycol (3.58 moles), 0.3 gram of lead oxide, 75 grams of adipic acid (0.51 mole), and 296 grams of trimellitic anhydride (1.54 moles) in a 2 liter glass resin kettle equipped with an electric heater, thermometer, sparge tube, agitator and condenser. The oiticica oil and 171 grams of the neopentyl glycol were initially charged to the resin kettle and the contents heated to approximately 440° F. with agitation and inert gas sparging until the alcoholysis reaction was complete (45–60 min.) as indicated by the standard methanol test (a clear solution from 1 part of test material and 3 parts of methanol).

The remaining neopentyl glycol (202 grams), the adipic acid and trimellitic anhydride were then charged to the resin kettle and the temperature adjusted to approximately 380° F. and held (approximately 3⅙ hours) until the acid number of the contents had reached 54–57.

The resin was converted into a water soluble resin by pouring it into a separate agitated thinning vessel which contained a mixture of 1178 grams of water, 208 grams of t-butyl alcohol, and 80 grams of dimethylethanolamine. The water soluble resin had the following characteristics: viscosity, (G. H.) $Z_5$; color, (Gardner) 11; nonvolatile material, 40%; and pH, 8.4.

A primer such as might be used in the automotive industry was formulated from the following ingredients and weights per 100 gallons of primer: Brown Iron Oxide B 209 F, 100 lbs.; VVF Barytes, 50 lbs.; ASP 400 China Clay, 100 lbs.; Micro Mica C–1000, 30 lbs.; Celite 281– Diatomaceous Silica, 50 lbs.; water, 139 lbs.; resin prepared from oiticica oil and containing 40% solids by weight 607 lbs.; and Advocar Lead, 24% lead by weight of solution, 5 lbs. The primer had a nonvolatile content of 55%, a pigment volume content of 33%, a viscosity (#4 Ford at 77° F. and measured in seconds) of 41.6, and a pH of 7.8.

Coatings (0.9 and 1.0 mil) were prepared from the primer on metal plates and baked at 250° F. for approximately 30 minutes. The baked coatings had impact strengths of over 80 in. lbs. and pencil hardnesses of H and HB for the 0.9 and 1.0 mil samples, respectively.

A baked coating (0.6 mil) was prepared from a comparison commercial primer based on an epoxy ester. This coating was baked at 385° F., the baking temperature usually required for this primer for 30 minutes. The 0.6 mil sample had an impact strength of over 80 in. lbs. and a pencil hardness of HB.

These results demonstrate that a primer prepared from an oiticica oil derived resin produces very suitable surface coatings when baked at 250° F. for approximately 30 minutes as evidenced by the highly desirable values of impact strength (over 80 in. lbs.) and hardness (H and HB). This combination of properties (250° F. baking temperature, impact strength of over 80 in. lbs. and hardness of HB) is not obtained from a similar primer derived from linseed oil, another drying oil.

The results of Example I also demonstrate the very favorable comparison of the impact strengths and hardness of the coatings from the primer of Example I as compared to the impact strength (80 in. lbs.) and hardness (HB) of the comparison commercial primer derived from the epoxy ester.

Example II

A resin was formulated from the following reactants including a vinyl toluene monomer: (1) 279 grams of oiticica oil, 324 grams of neopentyl glycol, and 0.2 gram of Litharge; (2) 131 grams of vinyl toluene and 1.31 grams of di-t-butyl peroxide; and (3) 258 grams of trimellitic anhydride and 65 grams of adipic acid. The reactants of (1) were added to a resin kettle described in Example I and heated to approximately 380° F. until the methanol test (described in Example I) indicated that the alcoholysis reaction was complete (about ½ hour). Approximately one half of the di-t-butyl peroxide in (2) was added to the vinyl toluene monomer and the remaining one half to the contents of the resin kettle. The contents of the resin kettle were cooled to approximately 330° F. and the vinyl toluene solution was added dropwise to the contents of the resin kettle for a two-hour period. The temperature was held at approximately 340° F. during which refluxing was carried out and continued for about two hours. The reactants of (3) were added to the contents of the resin kettle and the temperature was raised slowly to approximately 370° F. and held until the acid number reached approximately 30 during which time the water of reaction and unreacted vinyl toluene monomers were removed overhead. Approximately 30 grams of vinyl toluene were recovered. The warm resin was added to a solution of 1,180 ml. of water, 260 ml. of t-butyl alcohol and 90 ml. of dimethylethanolamine. The water soluble resin had a pH of 8–9, a solids content of 30%, a viscosity of Z–7, and a color of 8.

An automotive-type primer was formulated from this resin and included the following ingredients and weights based on 100 gallons of primer: Brown Iron Oxide B 2093 F, 100 lbs.; VVF Barytes, 150 lbs.; ASP 400 China Clay, 100 lbs.; Micro Mica C–1000, 30 lbs.; water, 145 lbs.; resin formulated from vinyl toluene and containing 29.8% solids by weight, 595 lbs.; Advocar Lead, 24% lead by weight of solution, 4.8 lbs.; and cobalt naphthenate, 6% cobalt by weight of solution, 4.1 lbs. The primer had a nonvolatile content of 49.5%, a pigment volume content of 41.2%, a viscosity (#4 Ford at 77° F. and measured in seconds) of 41.8, and a pH of 9.0.

A coating (1.2 mils) was prepared from this primer and baked at 250° F. for approximately 30 minutes. The coating exhibited an impact resistance of 78 in. lbs., a pencil hardness of B and had a 100% rating in the Bend Test (Gardner and Sward Paint Testing Manual, Chapter 7, page 141).

These results when compared to those from the comparison epoxy ester primer of Example I demonstrate that the primer of Example II produced a coating which exhibited very suitable impact strength (78 in. lbs.) and hardness (B), in adition to its flexibility (100% in Bend Test).

*Example III*

A comparison was made between coatings prepared from the primers of Example I and the commercial epoxy ester primer and between coatings prepared from the primer of Example II and the commercial epoxy ester primer in a Salt Spray Test (ASTM Standards D–1, Method B 117–54T Salt Spray (Fog) Testing, pages 647–654, January 1955) and in an adhesion test.

Generally, the Salt Spray Test was carried out by making deep cuts in the coated metal sample to expose the metal. The sample was then exposed to a salt spray for periods of time during which the sample was periodically inspected to determine the extent that rusting had spread from the exposed metal to the protected metal and the extent that the coating was not washed off by a stream of water, with the tests being identified as Rust Creep and Wet Adhesion, respectively. A value of 10 in each test is the best rating with a number lower than 10 indicating a less favorable rating. An indication of the scales is given below:

Rust creep:
    10—none.
    9—1/64" wide rusted area.
    8—1/32" wide rusted area.
    7—3/64" wide rusted area.
Wet adhesion:
    10—no loss.
    8—very slight.
    5—slight.
    2—severe.
    0—complete loss.

In the Adhesion Test, acrylic-type top coats were applied over the baked coatings from the primers and the resultant coatings were then baked again. These coatings were then tested in the Cross Hatch Adhesion Test. The Cross Hatch Adhesion Test was carried out by making ten parallel scratches to penetrate the coating after which ten additional scratches were made perpendicular to the previous scratches. The result was 100 squares of coating, each having a dimension of 1/16 of an inch. A commercial masking tape was pressed over the test squares and then violently removed. The number of squares having their coatings intact was then recorded as the rating for the test. The higher the rating the better the adhesion of the coating.

Tables I and II lists the results for the primer of Example I and the epoxy-ester primer while Tables III and IV list the results for the primer of Example II and the epoxy-ester primer.

TABLE I

| Primer Type | Film Tk (mils) | Cure | Salt Spray | | | |
|---|---|---|---|---|---|---|
| | | | 250 hr. | | 500 hr. | |
| | | | Rust Creep | Wet Ad | Rust Creep | Wet Ad |
| Oiticica Oil | 1.0 | 30 min./250° F | 8 | 10 | 8 | |
| Epoxy Ester | 1.0 | 30 min./385° F | 9 | 10 | 7 | |

TABLE II

| Primer Type | Baking Temp. ° F., Primer/Topcoat | Film Tk (mils), Primer/Topcoat | Cross Hatch Adhesion, Percent Retention |
|---|---|---|---|
| Oiticica Oil | 250/225 | 1.3/2.3 | 90 |
| Epoxy Ester | 385/250 | 1.9/2.2 | 15 |

The results from Tables I and II demonstrate that the oiticica oil coating exhibited good protection against rusting in the Rust Creep Test and good adhesion in the Cross Hatch Adhesion Test. The Rust Creep rating for the oiticica oil coating was unchanged (from 8 to 8) after the 250 hours of testing exposure (500 hr.–250 hr.) while the epoxy-ester coating dropped from 9 to 7 in the same test. While the oiticica oil coating did not give as favorable results (10 to 2) in the Wet Adhesion Test as those (10 to 5) for the epoxy-ester coating, the oiticica oil coating exhibited very superior results (90%) in the Cross Hatch Adhesion Test compared to those (15%) of the epoxy-ester primer.

TABLE III

| Primer Type | Film Tk (mils) | Cure | Salt Spray | | | |
|---|---|---|---|---|---|---|
| | | | 250 hr. | | 500 hr. | |
| | | | Rust Creep | Wet Ad | Rust Creep | Wet Ad |
| Oiticica Oil and Vinyl Toluene | 1.0 | 30 min./250° F | 9 | 8 | 9 | 8 |
| Epoxy Ester | 1.0 | 30 min./385° F | 9 | 10 | 7 | 5 |

TABLE IV

| Primer Type | Baking Temp. ° F., Primer/Topcoat | Film Tk (mils), Primer/Topcoat | Cross Hatch Adhesion, Percent Retention |
|---|---|---|---|
| Oiticica Oil and Vinyl Toluene | 250/250 | 1.5/2.1 | 75 |
| Epoxy Ester | 385/250 | 1.9/2.2 | 15 |

The results from Tables III and IV demonstrate that the coating derived from oiticica oil and vinyl toluene exhibited very good protection of the underlying metal in both the Rust Creep Test and Wet Adhesion Test in that the ratings (9 to 9 and 8 to 8, respectively) remained unchanged after the 250 hr. testing period, and that the coating exhibited very good adhesion (75%) in the Cross Hatch Adhesion Test, while the epoxy ester coating dropped from 9 to 7 in the Rust Creep Test and from 10 to 5 in the Wet Adhesion Test, and had a rating of only 15% in the Cross Hatch Adhesion Test.

*Example IV*

A comparison of the salt spray resistant and adhesive properties of the coatings (from primers) from the resins of Examples I and II was made. The formulation for each primer was 100 lbs. of Brown Iron Oxide, 150 lbs. of Sparmite Barytes, 100 lbs. of China Clay, 30 lbs. of Micro Mica, 126 lbs. of water, 608 lbs. of test resin having a 40% solids content by weight, 6 lbs. of a commercial lead drier (Advocar Lead containing 24% lead by weight), and 4 lbs. of a commercial lead naphthenate (6% cobalt by weight). The same acrylic topcoat as described in Example III was applied over each baked primer.

The results of the Salt Spray Test are listed in Table V and those from the Cross Hatch Adhesion Test are listed in Table VI.

TABLE V

| Primer Type | Film Tk (mils) | Cure | Salt Spray | | | |
|---|---|---|---|---|---|---|
| | | | 284 hr. | | 480 hr. | |
| | | | Rust Creep | Wet Ad | Rust Creep | Wet Ad |
| Oiticica Oil | 1.0 | 30 min./250° F. | 8 | 10 | 8 | 2 |
| Oiticica Oil and Vinyl Toluene | 1.6 | 30 min./250° F. | 9 | 10 | 8 | 8 |

TABLE VI

| Primer Type | Baking Temp. ° F., Primer/ Topcoat | Film Tk (mils), Primer/Topcoat | Cross Hatch Adhesion, Percent Retention |
|---|---|---|---|
| Oiticica Oil | 250/250 | 1.5/2.1 | 30 |
| Oiticica Oil and Vinyl Toluene | 250/250 | 1.6/1.9 | 90 |

The results in Tables V and VI demonstrate the superior performance of the coating from the vinyl toluene modified resin compared to the coating from the unmodified resin in both the Wet Adhesion Test and Cross Hatch Adhesion Test. After the 196 hr. exposure period (between the 284 hr. and 480 hr. testing times), the rating of the coating from the vinyl toluene modified resin dropped from 10 to 8 while the rating of the coating from the unmodified resin dropped from 10 to 2. In the Cross Hatch Adhesion Test, 90 percent of the vinyl toluene coating remained intact while only 30% of the coating from the unmodified resin remained intact. In Example III, this property was improved to a much better value (90%) by the addition of diatomaceous silica, but a direct comparison of resin effect reveals that the vinyl toluene modified resin produces coatings which exhibit better results in the Cross Hatch Adhesion Test in addition to superior salt spray resistance.

Thus having described the invention, what is claimed is:

1. A resin composition consisting of the polycondensation reaction product of trimellitic anhydride, adipic acid, an alkylene glycol having about 5 carbon atoms, and oiticica oil, in a respective mole ratio of about 3:1:7:2/3, said resin being characterized by a baking temperature of approximately 250° F. at a time of approximately 30 minutes.

2. The resin of claim 1 solublized with an alkaline agent.

References Cited

UNITED STATES PATENTS

| | | | |
|---|---|---|---|
| 2,856,374 | 10/1958 | Bolton | 260—22 |
| 2,870,102 | 1/1959 | Van Strien | 260—22 |
| 2,941,968 | 6/1960 | McKenna | 260—22 |
| 3,047,525 | 7/1962 | Broadhead | 260—75 |
| 3,070,256 | 12/1962 | Bremmer et al. | 260—22 |

DONALD E. CZAJA, *Primary Examiner.*

LEON J. BERCOVITZ, *Examiner.*

R. W. GRIFFIN, *Assistant Examiner.*

UNITED STATES PATENT OFFICE
CERTIFICATE OF CORRECTION

Patent No. 3,367,894                     February 6, 1968

Carl E. Bruggeman

It is hereby certified that error appears in the above numbered patent requiring correction and that the said Letters Patent should read as corrected below.

Column 6, line 39, for "55" read -- 53 --; column 8, TABLE I, under "500 hr." subheading "Wet Ad " lines 1 and 2, insert figures -- 2 --, and -- 5 --; TABLE II, second column heading, for "Backing" read -- Baking --.

Signed and sealed this 1st day of April 1969.

(SEAL)
Attest:

Edward M. Fletcher, Jr.

Attesting Officer

EDWARD J. BRENNER

Commissioner of Patents